(12) United States Patent
Paluch et al.

(10) Patent No.: US 11,836,534 B2
(45) Date of Patent: Dec. 5, 2023

(54) PREDICTION OF PROFICIENT RESOURCES FOR PERFORMING UNPRECEDENTED WORKLOADS USING MODELS

(71) Applicant: International Business Machines Corporation, Armonk, NY (US)

(72) Inventors: Michal Paluch, Cracow (PL); William Carbone, Cittanova (IT); Erik Rueger, Ockenheim (DE); Nicolo' Sgobba, Fasano (IT)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 17/158,487

(22) Filed: Jan. 26, 2021

(65) Prior Publication Data

US 2022/0237047 A1 Jul. 28, 2022

(51) Int. Cl.
*G06F 9/50* (2006.01)
*G06N 3/045* (2023.01)

(52) U.S. Cl.
CPC ............ *G06F 9/5077* (2013.01); *G06F 9/505* (2013.01); *G06F 9/5011* (2013.01);
(Continued)

(58) Field of Classification Search
CPC .... G06F 9/5077; G06F 9/5011; G06F 9/5044; G06F 9/505; G06F 2209/5017;
(Continued)

(56) References Cited

U.S. PATENT DOCUMENTS 7,779,415 B2  8/2010 Bisdikian
8,204,809 B1  6/2012 Wise
(Continued)

FOREIGN PATENT DOCUMENTS

CN   106611277 A  *  5/2017
CN   111324667 A  *  6/2020
WO      0013101 A1    3/2000

OTHER PUBLICATIONS

Fan et al. CN106611277A Description Translation May 3, 2017 [retrieved on Aug. 26, 2022] Retrieved from Espacenet using Internet <URL:https://worldwide.espacenet.com/publicationDetails/description?CC=CN&NR=106611277A&KC=A&FT=D&ND=3&date=20170503&DB=&locale=en_EP>, pp. 1-8 (Year: 2017).*

(Continued)

*Primary Examiner* — Meng Ai T An
*Assistant Examiner* — Hsing Chun Lin
(74) *Attorney, Agent, or Firm* — Aaron N. Pontikos (57) ABSTRACT

One or more processors receive resource type and capability information and activity information of workloads of a domain. A first model is generated and trained to map the resource information to the activity information of domain workloads. The activity information is decomposed into a set of activity core elements (ACEs). The one or more processors generate a second model, wherein the second model is trained to predict a set of resource types and resource capabilities of the respective resource types, based on an input of the first set of ACEs decomposed from the activity information of the workloads of the domain. The one or more processors receive a second set of ACEs that are decomposed from activities associated with an unprecedented workload, and the one or more processors generate a predicted set of resources to perform the second set of ACEs.

16 Claims, 4 Drawing Sheets

(52) U.S. Cl.
CPC ........... *G06F 9/5044* (2013.01); *G06N 3/045* (2023.01); *G06F 2209/503* (2013.01); *G06F 2209/5017* (2013.01); *G06F 2209/5019* (2013.01); *G06F 2209/5022* (2013.01)

(58) Field of Classification Search
CPC ..... G06F 2209/5019; G06F 2209/5022; G06F 2209/503; G06N 3/0454; G06N 3/045; G06N 3/04; G06N 3/08
See application file for complete search history.

(56) References Cited

U.S. PATENT DOCUMENTS

| | | | |
|---|---|---|---|
| 10,142,260 B2 | 11/2018 | Buehrer | |
| 2006/0012822 A1* | 1/2006 | Matsumoto | G06T 15/08 358/1.15 |
| 2008/0262822 A1* | 10/2008 | Hardwick | G06F 11/3457 703/21 |
| 2013/0086589 A1* | 4/2013 | Levien | G06F 9/5044 718/102 |
| 2013/0111488 A1* | 5/2013 | Gatti | G06N 20/10 718/103 |
| 2018/0032375 A1* | 2/2018 | Tan | G06F 9/5055 |
| 2020/0372473 A1* | 11/2020 | Muralikrishnan | G06Q 50/2057 |
| 2022/0012089 A1* | 1/2022 | Nasr-Azadani | G06N 5/04 |

OTHER PUBLICATIONS

Feng et al. CN111324667A Description Translation, Jun. 23, 2020, [database online], [retrieved on Sep. 23, 2023] Retrieved from Espacenet using Internet <URL:https://worldwide.espacenet.com/publicationDetails/description?CC=CN&NR=111324667A&KC=A&FT=D&ND=3&date=20200623&DB=&locale=en_EP, pp. 1-43 (Year: 2020).*

"Selflearning Method to Predict a Workload Indicator for Provisioning of Resources", Original Publication Date: Sep. 18, 2007, IP.com No. IPCOM000158172D, P.com Electronic Publication Date: Sep. 18, 2007, 11 pps., <https://priorart.ip.com/IPCOM/000158172>.

Rashida et al., "An intelligent approach for predicting resource usage by combining decomposition techniques with NFTS network", Received: Sep. 21, 2019 / Revised: Mar. 13, 2020 / Accepted: Mar. 22, 2020, Springer Science+Business Media, LLC, part of Springer Nature 2020, Cluster Computing, 26 pps., <https://sci-hub.se/https://link.springer.com/article/10.1007/s10586-020-03099-x>.

Ullah et al., "Adaptive Resource Utilization Prediction System for Infrastructure as a Service Cloud", Hindawi, Computational Intelligence and Neuroscience, vol. 2017, Article ID 4873459, 12 pages, <https://www.hindawi.com/journals/cin/2017/4873459/>.

* cited by examiner

PREDICTION OF PROFICIENT RESOURCES FOR PERFORMING UNPRECEDENTED WORKLOADS USING MODELS

FIELD OF THE INVENTION

The present invention relates generally to the field of predictive models, and more particularly to predicting resources to fulfill unprecedented workloads.

BACKGROUND OF THE INVENTION

Confronted with accomplishing an objective or outcome, understanding the entirety of work, activity, and/or tasks to be performed, also referred to as a workload, is often helpful in assuring adequate and appropriate resources are available to fulfill the objective or outcome. A workload can be further understood in terms of the activities involved in achieving the outcome. Performance of a set of activities towards a planned outcome, often done multiple times, can result in confirming a corresponding set of resources used to accomplish the set of activities. The set of activities that collectively result in a planned or desired outcome can be considered a workload, and the set of activities to accomplish the workload depend on a corresponding set of resources. Determining the resources required to successfully achieve the desired outcome can provide information related to costs, timing, and other attributes.

SUMMARY

Embodiments of the present invention disclose a method, computer program product, and system for predicting resources to perform a set of activity core elements to achieve an unprecedented workload towards an expected outcome. The method provides for one or more processors to receive resource type and resource capability information of resources within a domain. The one or more processors receive activity information of workloads of the domain. The one or more processors generate a first model, wherein the first model is trained to map the resource type and resource capability information to the activity information of the workloads of the domain. The one or more processors decompose the activity information of the workloads of the domain into a first set of activity core elements (ACEs). The one or more processors generate a second model, wherein the second model is trained to predict a set of resource types and resource capabilities of the respective resource types, based on input of the first set of ACEs decomposed from the activity information of the workloads of the domain. The one or more processors receive a second set of ACEs that are decomposed from activities associated with an unprecedented workload, and the one or more processors generate a predicted set of resources to perform the second set of ACEs.

DETAILED DESCRIPTION

Embodiments of the present invention recognize that undertaking an unprecedented workload includes risks that can have negative consequences, which may include failure to complete the workload, delays in completion or reduction in quality as compared to expectations, cost escalation, and impacts to other existing workloads. An unprecedented workload has components or expected outcomes that are not well-understood or experienced from previous iterations. The elements contributing to an unprecedented condition may include aspects of capacity, volume, timing and/or duration, unique combinations, or other elements.

Embodiments of the present invention recognize that successful completion of a workload has a dependence on the resource type, resource attributes, and resource availability. Embodiments also recognize that a workload is comprised of activities or tasks to be performed towards an expected or desired outcome and that an activity can be further decomposed to base components used to fulfill or perform the activity, herein referred to as activity core elements (ACEs).

Embodiments of the present invention provide a method, computer program product, and computer system for predicting resources to perform a set of activity core elements to achieve an unprecedented workload towards an expected outcome. Prediction of resources to achieve an outcome by the performance of a set of ACEs decomposed from activities associated with the unprecedented workload can apply to computing environments, but can also apply to projects performed by humans, sequences of automation, and other instances in which types of resources perform activities or tasks toward achieving an outcome. Embodiments of the present invention may apply to a wide variety of environments and situations, and examples directed towards computer-based environments are presented herein to explain and clarify embodiments of the present invention without limitation of implementation to specific environments and instances.

Embodiments of the present invention include sources of current resources, which further include the type and capabilities determined for each resource. In one domain, for example, a distributed computing environment such as a cloud environment, resources may include (but are not limited to) nodes or central processing units (CPUs), graphical processing units (GPUs), memory, storage, and network communications. The resources may have additional components and metadata that further identify the uniqueness of the resource, such as the number of cores, cache size, and instruction frequency of CPUs, and capacity and speed of memory. Resource information may be accessed or received from resource providers or testing services that determine and confirm performance measures of resource components.

In some embodiments, currently understood workloads include sets of operational activities and tasks performed toward a desired or expected outcome and initiated by a user request or query, programmatic initiation, or other triggering events. Each activity of the set of activities of a workload can be further decomposed to ACEs, and an ACE can be used and mutually shared by multiple activities. Workloads and the activities and tasks associated with respective workloads that have been performed multiple times and are well-established, are understood and identifiable within a domain in which the workload is performed. For example, a record location request as a computer-based activity may decompose into ACEs of, receive target record input, transform input to storage location format, set command to search storage for location format of the record, locate record storage, match record identification, present record location information. As an additional example, a house construction carpentry activity may decompose into ACEs of framing, flooring, rafters, base siding, and base roofing. In some embodiments, the level of establishing an ACE may be extended based on the domain of the activity. For example, the carpentry activity of framing may be decomposed further to ACEs of framing walls, windows, doorways, floors, and ceilings.

Embodiments of the present invention receive information identifying resources and the demonstrated capability of the respective resources and receive sets of activities associated with known workloads performed within the particular environment. Embodiments generate and train a first neural network model that maps the demonstrated capabilities of a plurality of resources to activities of current known workloads that are performed by use of the resource capabilities. For respective activities of the set of activities received, embodiments of the present invention decompose the activities into ACEs, completing the mapping of resources as inputs to the first neural network to sets of ACEs of activities as outputs.

Embodiments generate and train a second neural network (NN2) in which ACEs are applied as input and the output is a set of capabilities of resources to perform the activities associated with the ACEs included as input. Embodiments of the present invention receive an unprecedented workload and the activities and metadata associated with the unprecedented workload. Embodiments decompose the activities to ACEs and apply the ACEs of the unprecedented workload as inputs to a trained second neural network model to output a predicted set of resources and associated metadata with the capability to perform the unprecedented workload. In some embodiments, the unprecedented workload may include activities that include ACEs that are not well known or established, which may generate output resources that extend beyond well-established resources when included as input ACEs to the trained second neural network. In some embodiments, the trained second neural network may extrapolate from the established mapping of resources to activities, decomposed to ACEs, to generate a resource having capability beyond the current established resources.

In some embodiments, an unprecedented workload may be a particularly complex data processing workload in a cloud environment or may be a processing volume not previously performed as an individual workload. In some embodiments the unprecedented workload may be a processing speed not previously performed for an ongoing or extended time basis or may require an extensive search, read, write operations with extensive transactions, not previously performed.

Embodiments of the present invention recognize that workloads and resources may apply to user-based projects and transactions in which the resources include the skill set of the users, access to information, and tools. An example may be a construction project that has not been previously attempted.

Figure 1:
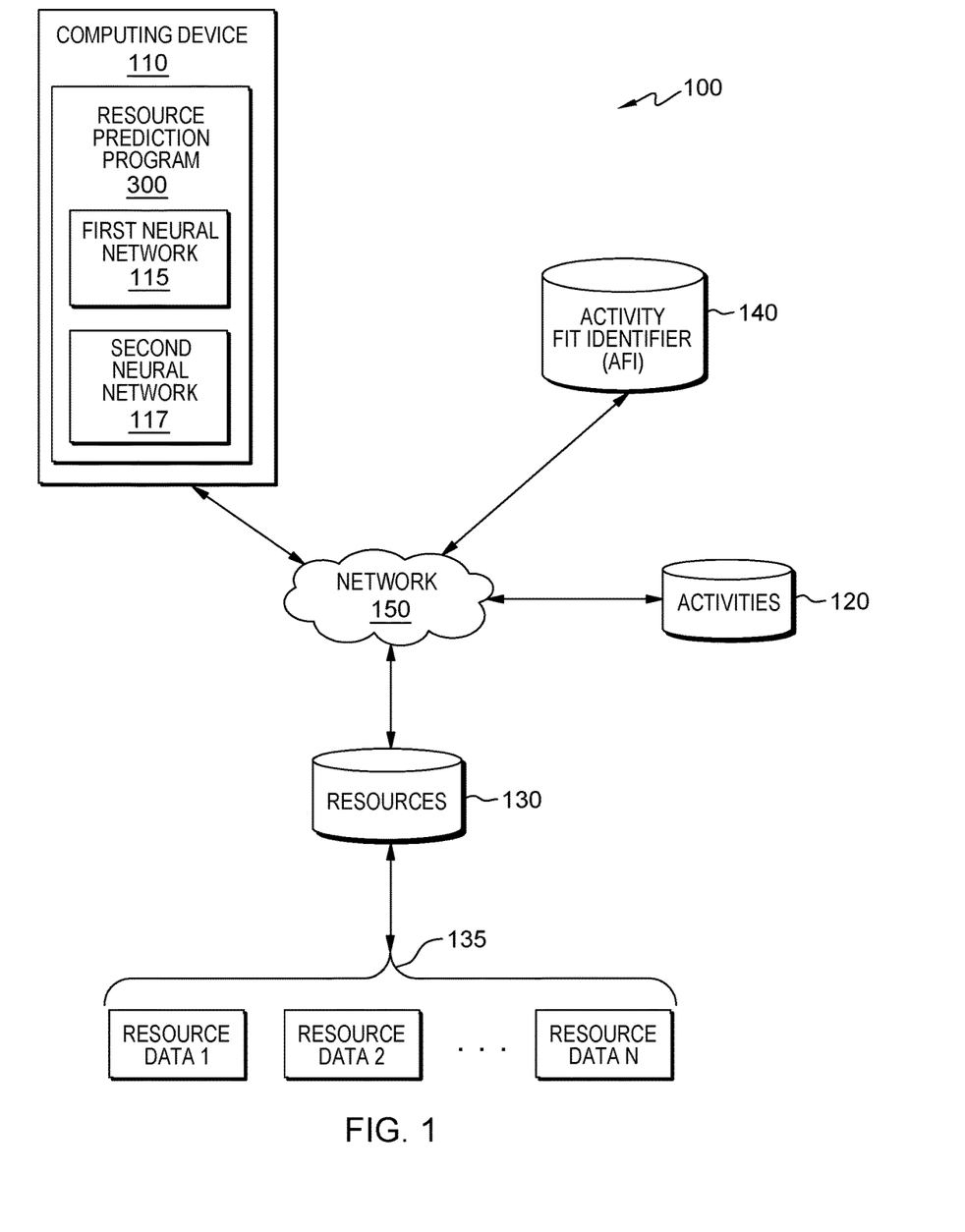
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes computing device 110, activities source 120, resources 130, resource data sources 135, and activity fit identifier (AFI) 140, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission.

Computing device 110 includes resource prediction program 300, which is further depicted as including first neural network 115 and second neural network 117. In some embodiments, the computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with activities source 120, resources 130, and activity fit identifier (AFI) 140, via network 150, as well as performing operations of resource prediction program 300. Alternatively, in some embodiments, computing device 110 may be communicatively connected to resource prediction program 300, operating remotely (not shown). Computing device 110 may include internal and external hardware components, depicted in more detail in FIG. 4.

Resource prediction program 300 is an application for forecasting resources to perform unprecedented workloads based on activity core elements as inputs. In some embodiments, resource prediction program 300 receives resource information associated with demonstrated capabilities of current resources and receives activity information of currently performed workloads in an identified environment, such as distributed computer processing environment 100. Resource prediction program 300 generates a first model that maps resource capabilities to the activities of workloads that are performed by applying the resource capabilities. In some embodiments, the first model is a neural network trained by the input of resource capability information and generating an output of activities that can be performed by the resource.

Resource prediction program 300 decomposes the output activities of the first neural network to ACEs. Resource prediction program 300 generates and trains a second neural network in which ACEs of activities from the output of the first neural network are applied as inputs and the second neural network generates outputs of resource capabilities to perform the input ACEs. Resource prediction program 300 receives an unprecedented workload and determines the known activities included in performing the workload and decomposes the activities to ACEs. In some embodiments, activities that are not currently practiced and familiar may be included as distinct ACEs as input to the second neural network for the unprecedented workload.

Resource prediction program 300 receives the ACEs, which are sub-level components of the activities associated with the unprecedented workload, and applies the ACEs as input to the second neural network model, which results in an output of forecasted resource capabilities to perform the unprecedented workload. In some embodiments, resource prediction program 300 includes generating and training of the first neural network and the second neural network, with user interaction for training of the neural network models. In some embodiments, resource prediction program 300 includes first neural network 115 and second neural network 117. In other embodiments, resource prediction program 300 is communicatively connected to first neural network 115 and second neural network 117 as externally hosted models (not shown).

First neural network 115 is a model that is trained to map resources to activities of workloads. First neural network 115 receives a plurality of resources that are well-established and regularly used for performing well-established activities of workloads. First neural network 115 includes an input layer, one or more hidden layers, and an output layer, and may use a bi-directional function to attain optimized output. In some embodiments, first neural network 115 may be a component of resource prediction program 300. In other embodiments, first neural network 115 may be externally hosted and communicatively connected to resource prediction program 300.

Second neural network 117 is a model that is trained to generate a forecast of resources to perform an unprecedented workload, based on the input of ACEs associated with activities of an unprecedented workload. Second neural network 117 receives a plurality of ACEs associated with activities of an unprecedented workload and outputs a forecast of resources to perform the unprecedented workload. Second neural network 117 includes an input layer, one or more hidden layers, and an output layer, and may use a bi-directional function to attain optimized output. In some embodiments, first neural network 117 may be a component of resource prediction program 300. In other embodiments, first neural network 117 may be externally hosted and communicatively connected to resource prediction program 300. First neural network 115 and second neural network 117 are depicted and discussed in more detail with respect to FIG. 2A and FIG. 2B, respectively.

Activity sources 120 is a compilation of well-established activities that are components of workloads, and when performed in an appropriate combination, result in the completion of the workload as an outcome. In some embodiments of the present invention, workload activities are identified by practitioners of workload design, planning, and performance for a particular environment. Examples of activities for a computer processing environment may include record identification, data matching, creation of data views, query optimization, opening files, saving files, among others.

Resources 130 is a compilation of well-established resource types, as well as capability information of the resource as metadata associated with respective resources. In some embodiments, resources 130 includes information that identifies the respective resource and includes information regarding the resource type and demonstrated capabilities supporting the proficiency of the resource. In some embodiments, resources 130 includes resources for a designated domain of workload, such as computer processing, whereas, in other embodiments, resources 130 includes resource types and associated information for multiple domains.

Examples of resources and information associated with the respective resource compiled in resources 130 for a computer-based environment include, but are not limited to, central processing units (CPUs) with associated information of the number of cores, amount and type of cache, and instruction processing speed (GHz); memory with associated capacity level and read/write speed; and storage with associated information of capacity and read/write speed. In some embodiments of workloads performed by users, resources may include types of skills and a level of skill that may be based on education, training, and experience. For example, a workload may be the construction of a building with resources that include users with skill sets in foundation construction, landscaping, carpentry, plumbing, electrical, roofing, siding, and painting, as well as tools used by the skilled users.

Resource data sources 135 includes information identifying a resource, the type of resource, and additional capabilities and specifications. In one embodiment, resource data sources 135 is crawled, examining websites of resource sources that may include producers, distributors, as well as resource proficiency testing services that document a resource's proficiency against specifications or claims. In some embodiments, resource data sources 135 includes multiple sources of resource data for multiple resource types spanning a plurality of environments, which may include tools, machinery, computing components and assemblies, skilled users, or other resource types.

Activity Fit Identifier (AFI) 140 is a repository of mappings between resources and the associated resource information, and activities of workloads. In some embodiments, AFI 140 is a database created to record and store the information of resource and activity mapping. In one embodiment, multiple sources provide well-established resource and workload activity. The resource information is applied as input to first neural network 115 which, when trained, identifies activities as outputs that can be performed by use of the capability of the input resources. The output activities of the first neural network are further decomposed to ACEs, which can be shared among multiple activities or tasks. The ACEs are provided as input to second neural network 117 which, when trained, outputs resources and associated information about the resources that can be used to perform the set of ACEs. AFI 140 contains the mapping information between the resources and ACEs of established workload activities. In some embodiments, AFI 140 includes a ranking of resources with respect to proficiency at performing a particular set of ACEs, which can be accomplished by the use of a support vector machine using similarity functions. AFI 140 may serve as a source of selection of ACEs for input to subsequent forecasting of resources to perform a workload, and particularly for forecasting the resources to perform an unprecedented workload.

Figure 2A:
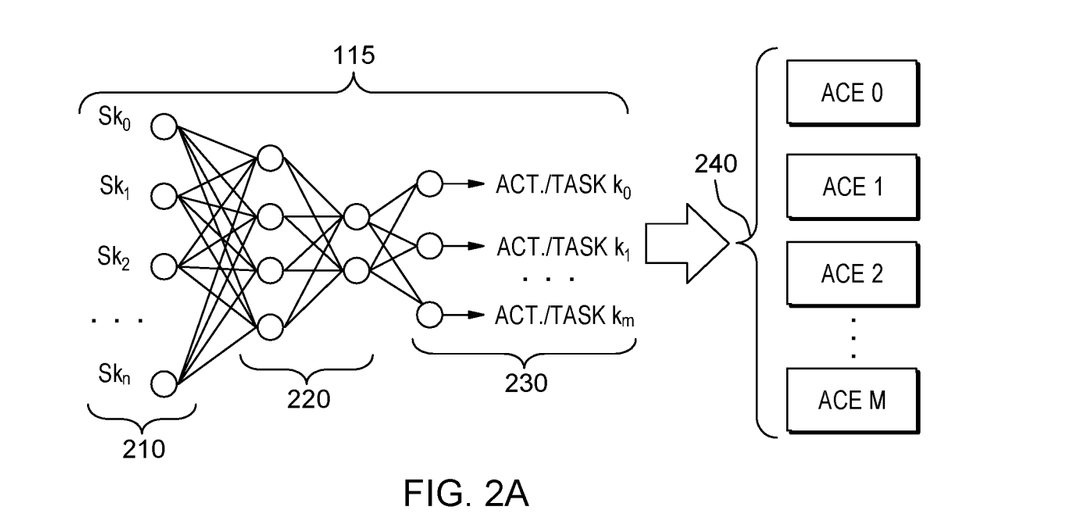
FIG. 2A depicts an illustrated representation of a first model that maps resources to activities, and the decomposition of activities to activity core elements (ACEs), in accordance with an embodiment of the present invention.

FIG. 2A depicts an illustrated representation of the first model that maps resources to activities, and the decomposition of activities to activity core elements (ACEs), in accordance with an embodiment of the present invention. The illustration of FIG. 2A provides details of first neural network 115 of FIG. 1 and includes input layer 210, hidden layers 220, and output layer 230. FIG. 2A also illustrates activity decomposition 240 of output activities and/or tasks to ACEs.

Input layer 210 includes a plurality of resources indicated as $Sk_0$ through $Sk_n$. First neural network 115 receives resources as inputs to nodes of the input layer and performs functions with nodes of hidden layers 220. First neural network 115 includes hidden layers 220, which contains one or more layers with weights assigned to each node of each layer as a result of the training of first neural network 115. First neural network 115, when trained, processes the inputs through hidden layers 220 and generates output activities/tasks in output layer 230, depicted as Act./Task $k_0$ through Act./Task $k_m$. First neural network 115 maps well-established inputs of resources of a particular environment in input layers 210 to established activities/tasks of output layer 230.

Activity decomposition 240 depicts activity core elements (ACEs) of the activities and/or tasks of output layer 230 of first neural network 115. Activity decomposition 240 includes $ACE_0$ through $ACE_m$. The ACEs are decomposed from the activities/tasks of output layer 230 and result in a more basic, fundamental level of action as a component of an activity. The decomposed ACEs of an activity, when performed result in the performance of the originating activity, and combinations of activities result in a workload.

Figure 2B:
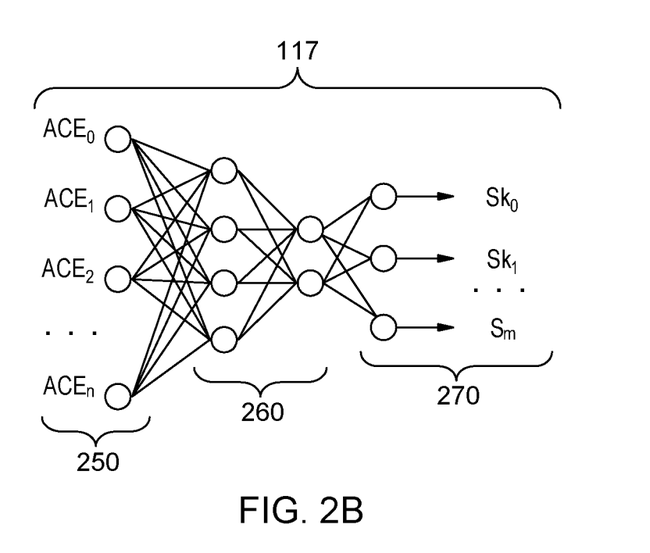
FIG. 2B depicts an illustrated representation of a second model that forecasts resources to perform an unprecedented workload, in accordance with an embodiment of the present invention.

FIG. 2B depicts an illustrated representation of second neural network 117, which is a model that forecasts resources to perform an unprecedented workload, in accordance with an embodiment of the present invention. Second neural network 117 includes input layer 250, hidden layers 260, and output layer 270. Input layer 250 receives ACEs of decomposed activities of an unprecedented workload and is depicted as including $ACE_0$ through $ACE_n$ of inputs. ACEs are components elements of activity and are applied as inputs to input layer 250 of second neural network 117. Input layer 250 is comprised of nodes that receive individual ACEs decomposed from the activity output of an unprecedented workload. Hidden layers 260 includes one or more layers that, when trained, assign weights and perform functions between nodes and layers of second neural network 117 optimizing the forecasting model.

Output layer 270 receives results from hidden layers 260 and includes a set of resources that combine to perform the ACEs of an unprecedented workload applied to input layer 250. In some embodiments of the present invention, output layer 270 includes resource information and resource information, which may be included as metadata, identifying a particular resource type and features that correspond to performing the set of ACEs applied as input. In some embodiments, a component of an unprecedented workload may not be fully represented by established resources and activities. In some embodiments, prediction program 300 includes second neural network 117 and may forecast a resource with features that are an extension of established resources, based on established activities, to perform an activity of the unprecedented workload.

Figure 3:
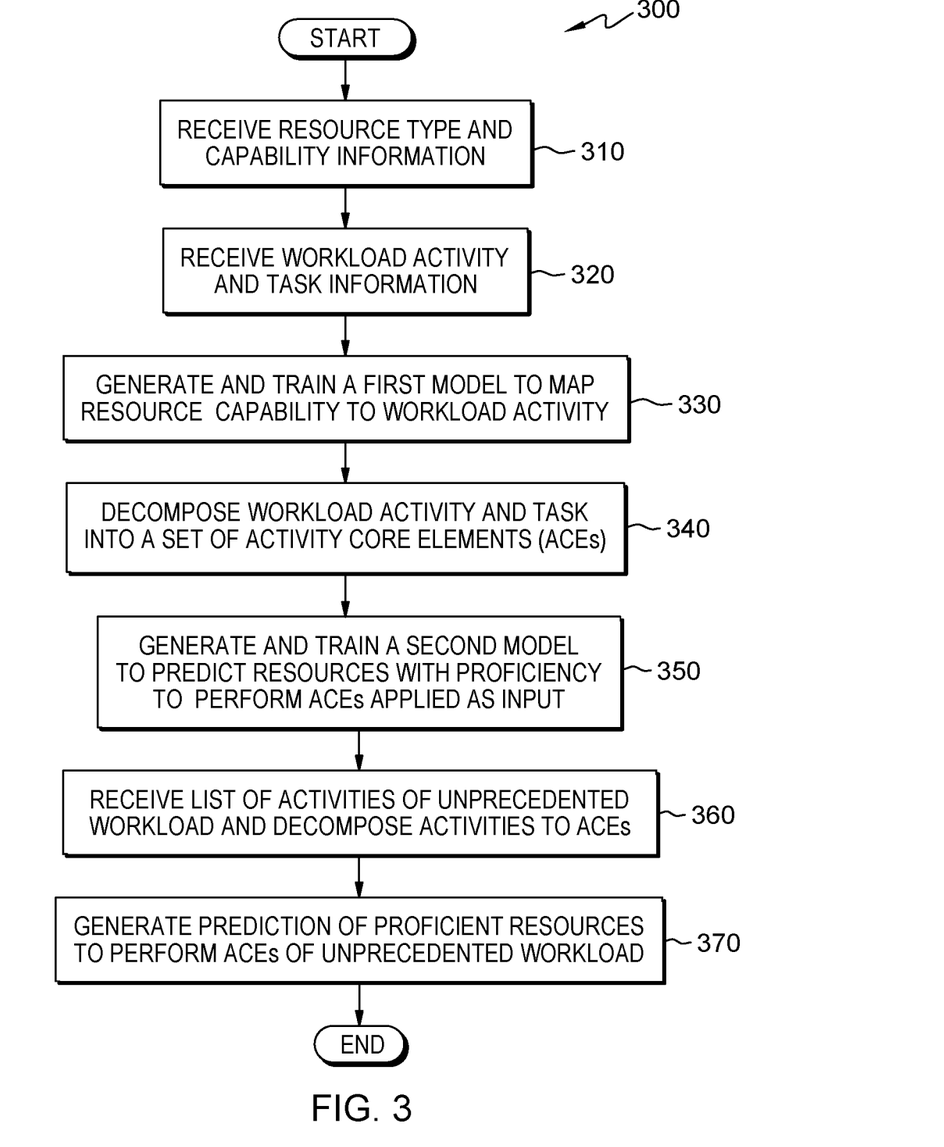
FIG. 3 is a flowchart depicting the operational steps of a resource prediction program operating in the distributed data processing environment of FIG. 1, in accordance with embodiments of the present invention.

FIG. 3 is a flowchart depicting the operational steps of resource prediction program 300 operating in distributed computer processing environment 100 of FIG. 1, in accordance with embodiments of the present invention. In some embodiments, resource prediction program 300 includes first neural network 115 and second neural network 117, which are trained by user intervention. In some embodiments, first neural network 115 and second neural network 117 are trained using supervised learning techniques, whereas in other embodiments, a combination of unsupervised and supervised learning techniques are used to train first neural network 115 and second neural network 117.

Resource prediction program 300 receives resource type and capability information (step 310). In some embodiments of the present invention, resource type and capability information is compiled in a repository accessible to resource prediction program 300, such as resources 130 (FIG. 1). Resource type information for a computer processing domain may include resources such as CPUs (central processing units), GPUs (graphical processing units), memory, storage, and network connection. The resource capability information may include the identifying designation of a resource, for example, a CPU may include information about the number of cores, cache capacity and speed, and clock speed of instruction execution (i.e., GHz), which may indicate the capability of the CPU as a resource.

In some embodiments, the capability of a resource may be further supported by independent testing in which the proficiency of the resource is demonstrated. In some embodiments, a resource repository includes a type of resource and respective resource information for a particular domain, such as computer processing resources, whereas, in other embodiments, the repository may include resource types and associated information for multiple domains.

For example, resource prediction program 300 accesses resources 130, which includes resource type and resource information of computer processing resources. The resource type and resource information is obtained and saved in resources 130 by web-crawling applications that access the resource type and resource capability information from existing web pages, such as from manufacturers or independent testing organizations.

Resource prediction program 300 receives workload activity and task information (step 320). In some embodiments, resource prediction program 300 accesses an activity repository, such as activities 120 (FIG. 1). Activities for established workloads within a domain are consolidated in the repository and received by resource prediction program 300 accessing the repository. In some embodiments, workload activities are acquired by scanning an instructional corpus of documents, such as computer science instructional documents for a computer processing domain.

For example, resource prediction program 300 accesses activities 120 and receives workload activities for a computer processing domain. The workload activities are compiled from scanning and extraction of web-published documents and textbooks that instruct the activities included in particular computer processing workloads. In other embodiments, one or more users with domain knowledge may compile a comprehensive listing of activities associated with respective workloads and store the activity listing in activities 120. In some embodiments, resource prediction program 300 may access the Activity Fit Identifier (AFI) 140 and receive activities associated with a particular domain, as well as ACEs that correspond to respective activities.

Resource prediction program 300 generates and trains a first model to map resource capability to workload activity (step 330). Resource prediction program 300 generates a model that maps the resources of a particular domain as inputs to the model, to activities associated with workloads within the particular domain. In some embodiments, resource prediction program 300 builds and trains the first model based on supervised and unsupervised learning techniques and user intervention to train the first model. The first model of resource prediction program 300, when trained, provides a set of activities associated with a workload, based on the input of a set of resources and resource information that includes resource type and capability. In some embodiments, the first model is generated and trained as a neural network, such as first neural network 115.

For example, resource prediction program 300 receives sets of resources and respective resource information from a repository of resources for a computer processing domain, such as resources 130. Resource prediction program 300, along with user interaction receives machine learning input and target output in supervised learning, and may include unsupervised learning techniques, to map the resources and resource information received as input to the first model to a set of established activities that are associated with an established workload of a designated domain. In some embodiments, the first model is a neural network.

Resource prediction program 300 decomposes workload activity & task into a set of activity core elements (ACEs) (step 340). Resource prediction program 300 identifies respective activities of the output of the first model and decomposes the activity into a set of core elements of the activity, referred to herein as activity core elements (ACEs). In some embodiments, the established activities have ACEs that are also practiced and understood by practitioners with knowledge of the particular domain of activities and workload. The ACEs are identified and associated with an activity and may be shared among multiple activities or tasks to which the ACE applies.

In some embodiments, ACEs are determined by scanning workload breakdown structure documents that include activity level and details of activities, for a given domain. The scanned documents identify ACEs associated with an activity of a workload and store the ACE and the relationship with the activity in a repository, such as the Activity Fit Identifier (AFI) 140. In some embodiments, ACEs for a particular activity are identified, documented, and stored by interaction with users having knowledge of activities of the domain. In other embodiments, ACEs are determined from instruction sets as described in domain-specific procedure manuals or other forms of knowledge base documentation, including code, algorithms, pseudocode, publications, intellectual capital, or intellectual property that depicts domain-specific methods implementable by a person having ordinary skills in the art.

For example, an activity of a record location request in a computer processing domain is output from the first model. The record location request activity is determined by reference to scanned instructional documents regarding the record location activity function of computer processing. The record location request activity may decompose into ACEs of, receive target record input, transform input to storage location format, set command to search storage for location format of the record, locate record storage, match record identification, present record location information.

In another example, an internet search activity of a computer processing domain may decompose into a set of ACEs that include: receive input search query, detect search query language, determine keywords from the search query, determine input location, match indexed records corresponding to the search query, and display/print results.

In yet another example, a source code compile process activity of a computer processing domain may decompose into ACEs that include: source code is expanded by a preprocessor, a compiler parses the expanded code into assembly code, an assembler defines the object code from the assembly code, a linker combines all the object code blocks with libraries, and a linker generates a computer-executable code ready for a loader to place the executable code in memory and queue the compiled code for execution.

Although examples of embodiments of the present invention included herein frequently refer to a computer processing domain, which may also be considered an environment, a person having ordinary skill in the art will recognize that embodiments also include other domains. For example, activities of a construction project may be decomposed to ACEs that when performed in combination, complete the activity. The ACEs may be the skills and experience of users combining to perform the construction project.

Resource prediction program 300 generates and trains a second model to predict resources with proficiency to perform the ACEs applied as input (step 350). Resource prediction program 300 generates and trains a second model that receives a set of ACEs of one or more workload activities as input and predicts resources that have a proficiency to perform the set of ACEs associated with workload activities within a particular domain. In some embodiments, resource prediction program 300 builds and trains the second model based on supervised and unsupervised learning techniques and user intervention to train the first model. The second model of resource prediction program 300, when trained, provides a prediction of resources that have demonstrated, or in some embodiments, extrapolated proficiency to perform the set of ACEs associated with activities of a workload. In some embodiments, the second model is generated and trained as a neural network, such as second neural network 117 (FIG. 1). In embodiments of the present invention, the second model receives ACEs of activities determined from an unprecedented workload.

For example, resource prediction program 300 receives a set of ACEs decomposed from activities output from first neural network 115. Resource prediction program 300, along with user interaction applies machine learning input and target output in supervised learning and may include unsupervised learning techniques, generate second neural network 117 to provide a predicted set of resources having the proficiency to perform the set of ACEs received as input and associated with activities of a workload of a designated domain.

Resource prediction program 300 receives a list of activities of an unprecedented workload and decomposes the activities to ACEs (step 360). An unprecedented workload may be similar to an established workload and include multiple activities that are established, but may include additional, new, or expanded activities as compared to the established workload. For example, the unprecedented workload may involve processing a volume of data that had not previously been performed or include a complex combination of processing steps that had not previously been performed or include an activity step for which there is no prior experience.

In some embodiments, having trained a second model for resource prediction, resource prediction program 300 receives a set of ACEs decomposed from activities of the unprecedented workload. In some embodiments, the unprecedented aspect of the workload may include one or more activity with a corresponding decomposition to ACEs that may include iteration, expansion of core elements, or include a new or unfamiliar core element, which is included as an ACE in the set of ACEs of the unprecedented workload. For instance, in the context of research and development, the aspects related to unprecedented workloads introducing novel activities or tasks to run experiments, are not uncommon. In some embodiments, resource prediction program 300 performs decomposition of the unprecedented workload activities, based on established activities and prior decomposition of activities stored in a repository, such as the Activity Fit Identifier (AFI) 140. In other embodiments, resource prediction program 300 receives the ACEs decomposed from the unprecedented workload activities from an external source, such as an external application or with user intervention.

For example, resource prediction program 300 receives a list of activities of the unprecedented workload and, accessing the Activity Fit Identifier (AFI) 140, obtains ACEs for the established activities that are included in AFI 140 from prior operation of first neural network 115 and second neural network 117, as well as user input from practitioners with knowledge in the domain of the unprecedented workload.

Resource prediction program 300 generates a prediction of proficient resources to perform ACEs of the unprecedented workload (step 370). The ACEs decomposed from the workload activities of the unprecedented workload are applied as input to the trained second model of resource prediction program 300 and provides a prediction of a set of resources that are determined to have the proficiency to perform the unprecedented workload. In some embodiments, the output of resources may include a plurality of resource combinations that are predicted to perform the unprecedented workload. In some embodiments, resource prediction program 300 may receive as an additional input to the training of the first model and the second model, external criteria used to prioritize resources, based on capability and other information about the resource. For example, external criteria may include determining the cost of acquiring or use of the resource. Additionally, external criteria may include time constraints in which a workload is completed, such as the fastest execution of the workload ranking higher as a preference than sets of resources that require a longer period of time to perform the workload.

In some embodiments, resource prediction program 300 presents the predicted resource output ranking the resources against external criteria provided to resource prediction program 300, such as from user input. By determining the resources to perform the unprecedented workload, a determination can be made regarding the impact, consequences, or judgment of performing the unprecedented workload. For example, the amount or type of resources that are predicted to successfully perform the unprecedented workload may impact the operation or performance of other workloads that are ongoing in a distributed cloud environment. In another example, the cost of performing the unprecedented workload may significantly exceed projections and offer an opportunity to reconsider or negotiate for more acceptable conditions.

Having provided a predicted set of resources to perform the set of ACEs of the unprecedented workload, resource prediction program 300 ends.

The resources output by the second model associated with resource prediction program 300 indicates the forecast of resources required to perform the unprecedented workload. Embodiments of the present invention provide advantages and improvement in forecasting technology involving workloads, and particularly workloads that can be categorized as "greedy" workloads that consume large amounts or high percentages of resources, including use cases in the context of research and development.

In some embodiments, the forecast of resources enables the determination of the cost of performing the unprecedented workload or determining whether the available or existing infrastructure can handle the unprecedented workload without impact to other concurrent processing workloads. Embodiments recognize that without a realistic and accurate forecast of resources, workloads would be attempted based on estimates, guesses, or trial-and-error approaches, often resulting in costly and unsuccessful consequences. Embodiments also recognize that domains in which resource prediction program 300 provides a forecast of resources for performing an unprecedented workload associated with cloud environments (all types), container environments, and environments including microservices.

In some embodiments, the ACEs decomposed from activities determined from unprecedented workloads, and the forecast of resources and the accompanying capability information are added to an Activity Fit Identifier database, such as AFI 140 (FIG. 1). The addition of new ACEs and any additional resources for an unprecedented workload to the activity fit identifier database enables a "learning" or cognitive aspect to resource prediction program 300.

Figure 4:
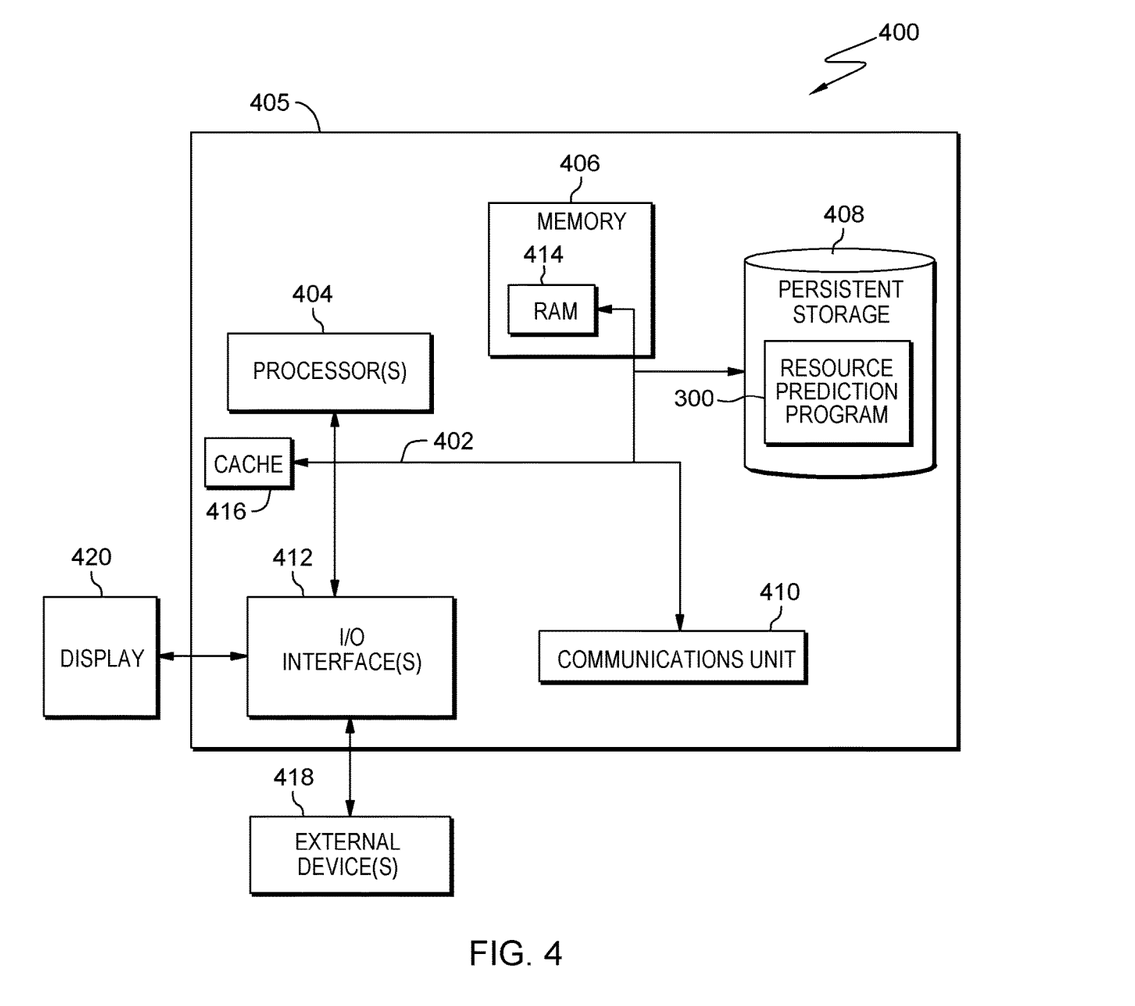
FIG. 4 depicts a block diagram of components of a computing system, including a computing device configured to operationally perform the resource prediction program of FIG. 3, in accordance with an embodiment of the present invention.

FIG. 4 depicts a block diagram of components of computing system 400, including computing device 405, configured to include or operationally connect to components depicted in FIG. 1, and with the capability to operationally perform resource prediction program 300 of FIG. 2, in accordance with an embodiment of the present invention.

Computing device 405 includes components and functional capability similar to components of computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, resource prediction program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Resource prediction program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., resource prediction program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or the other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for forecasting resource requirements of an unprecedented workload, the method comprising:
   receiving, by one or more processors, a resource type and demonstrated resource capability information of respective resources within a domain;
   receiving, by the one or more processors, activity information of known workloads of the domain;
   generating, by the one or more processors, a first model, wherein generating the first model includes training the first model to map the resource type and demonstrated resource capability information of the respective resources to the activity information of the known workloads of the domain, and wherein the mapping includes a ranking of the respective resources within the domain based on a first proficiency of a resource to perform an activity and first resource acquisition information associated with the resource;
   decomposing, by the one or more processors, the activity information of the known workloads of the domain into a first set of activity core elements (ACEs), wherein the first set of ACEs are sub-components of activities, associated with the resource type of the respective resources, of the known workloads of the domain;
   generating, by the one or more processors, a second model, wherein generating the second model includes training the second model to output a set of predicted resource types and resource capability information, based on an input of the first set of ACEs decomposed from the activity information of the known workloads of the domain and the mapping of the resource type and demonstrated resource capability information of the respective resources to the activity information of the known workloads of the domain, wherein the first model and the second model are generated as neural networks;
   receiving as input to the second model a second set of ACEs associated with a first unprecedented workload that includes a subset of the first set of ACEs decomposed from the activity information of the known workloads of the domain and new ACEs from decomposed activity information not included in the known workloads of the domain; and
   generating, by the one or more processors, a predicted set of resources by an output of the second model to perform the second set of ACEs associated with the first unprecedented workload, wherein the predicted set of resources are ranked based on a second proficiency of a predicted resource to perform at least part of the second set of ACEs associated with the first unprecedented workload and resource acquisition information associated with the predicted resource.

2. The method of claim 1, wherein the first set of ACEs and the second set of ACEs are saved in a repository and include information associated with corresponding activities.

3. The method of claim 1, wherein the first set of activity core elements (ACEs) that are decomposed from the activity information of the known workloads of the domain are shared among multiple activities of the known workloads of the domain.

4. The method of claim 1, wherein the predicted set of resources
   generates, by the one or more processors, a cognitive component to the first model by adding the predicted set of resources and the second set of ACEs associated with the first unprecedented workload to a repository.

5. The method of claim 1, further comprising:
   training, by the one or more processors, the first model by using a plurality of users with respective skills as input and a set of activities performed by one or more users of the plurality of users applying the respective skills;
   inputting, by the one or more processors, to the second model, a third set of ACEs decomposed from the set of activities performed by the one or more users; and
   generating, by the one or more processors, a set of resources including skills associated with the one or more users of the plurality of users, wherein the domain includes workload activities performed by the one or more users.

6. The method of claim 1, wherein the first model is trained using sets of the resource type and demonstrated resource capability information of current established resources, and corresponding sets of activities that are respectively performed using the sets of the resource type and demonstrated resource capability information.

7. A computer program product for forecasting resource requirements of an unprecedented workload, the computer program product comprising:
   one or more computer-readable storage media; and
   program instructions stored on at least one computer-readable storage medium, the program instructions comprising:
      program instructions to receive a resource type and demonstrated resource capability information of respective resources within a domain;
      program instructions to receive activity information of known workloads of the domain;

program instructions to generate a first model, wherein generating the first model includes training the first model to map the resource type and demonstrated resource capability information of the respective resources to the activity information of the known workloads of the domain, and wherein the mapping includes a ranking of the respective resources within the domain based on a first proficiency of a resource to perform an activity and first resource acquisition information associated with the resource;

program instructions to decompose the activity information of the known workloads of the domain into a first set of activity core elements (ACEs), wherein the first set of ACEs are sub-components of activities, associated with the resource type of the respective resources, of the known workloads of the domain;

program instructions to generate a second model, wherein generating the second model includes training the second model to output a set of predicted resource types and demonstrated resource capability information, based on an input of the first set of ACEs decomposed from the activity information of the known workloads of the domain and the mapping of the resource type and demonstrated resource capability information of the respective resources to the activity information of the known workloads of the domain, wherein the first model and the second model are generated as neural networks;

program instructions to receive as input to the second model a second set of ACEs associated with a first unprecedented workload that includes a subset of the first set of ACEs decomposed from the activity information of the known workloads of the domain and new ACEs from decomposed activity information not included in the known workloads of the domain; and program instructions to generate a predicted set of resources by an output of the second model to perform the second set of ACEs associated with the first unprecedented workload, wherein the predicted set of resources are ranked based on a second proficiency of a predicted resource to perform at least part of the second set of ACEs associated with the first unprecedented workload and resource acquisition information associated with the predicted resource.

8. The computer program product of claim 7, wherein the first set of ACEs and the second set of ACEs are saved in a repository and include information associated with corresponding activities.

9. The computer program product of claim 7, wherein program instructions, stored on the one or more computer readable storage media generate a cognitive component to the first model by adding the predicted set of resources and the second set of ACEs associated with the first unprecedented workload to a repository.

10. The computer program product of claim 7, operating in the domain and further comprising program instructions, stored on the one or more computer-readable storage media, to:

train the first model by using a plurality of users with respective skills as input and a set of activities performed by one or more users of the plurality of users applying the respective skills;

input to the second model, a third set of ACEs decomposed from the set of activities performed by the one or more users; and generate a set of resources including skills associated with the one or more users of the plurality of users, wherein the domain includes workload activities performed by the one or more users.

11. The computer program product of claim 7, wherein the first model is trained using sets of the resource type and demonstrated resource capability information of current established resources, and corresponding sets of activities that are performed using the sets of the resource type and demonstrated resource capability information.

12. A computer system for forecasting resource requirements of an unprecedented workload, the computer system comprising:

one or more computer processors;
at least one computer-readable storage medium; and
program instructions stored on the at least one computer-readable storage medium, the program instructions comprising:

program instructions to receive a resource type and demonstrated resource capability information of respective resources within a domain;

program instructions to receive activity information of known workloads of the domain;

program instructions to generate a first model, wherein generating the first model includes training the first model to map the resource type and demonstrated resource capability information of the respective resources to the activity information of the known workloads of the domain, and wherein the mapping includes a ranking of the respective resources within the domain based on a first proficiency of a resource to perform an activity and first resource acquisition information associated with the resource;

program instructions to decompose the activity information of the known workloads of the domain into a first set of activity core elements (ACEs), wherein the first set of ACEs are sub-components of activities, associated with the resource type of the respective resources, of the known workloads of the domain;

program instructions to generate a second model, wherein generating the second model includes training the second model to output a set of predicted resource types and demonstrated resource capability information, based on an input of the first set of ACEs decomposed from the activity information of the known workloads of the domain and the mapping of the resource type and demonstrated resource capability information of the respective resources to the activity information of the known workloads of the domain, wherein the first model and the second model are generated as neural networks;

program instructions to receive as input to the second model a second set of ACEs associated with a first unprecedented workload that includes a subset of the first set of ACEs decomposed from the activity information of the known workloads of the domain and new ACEs from decomposed activity information not included in the known workloads of the domain; and program instructions to generate a predicted set of resources by an output of the second model to perform the second set of ACEs associated with the first unprecedented workload, wherein the predicted set of resources are ranked based on a second proficiency of a predicted resource to perform at least part of the second set of ACEs associated with the first unprecedented workload and resource acquisition information associated with the predicted resource.

13. The computer system of claim 12, wherein the first set of ACEs and the second set of ACEs are saved in a repository and include information associated with corresponding activities.

14. The computer system of claim 12, wherein program instructions, stored on the at least one computer-readable storage medium for execution by at least one of the one or more computer processors generate a cognitive component to the first model by adding the predicted set of resources and the second set of ACEs associated with the first unprecedented workload to a repository.

15. The computer system of claim 12, operating in the domain further comprising program instructions, stored on the at least one computer-readable storage medium for execution by at least one of the one or more computer processors, to:

train the first model by using a plurality of users with respective skills as input and a set of activities performed by one or more users of the plurality of users applying the respective skills;

input to the second model, a third set of ACEs decomposed from the set of activities performed by the one or more users; and generate a set of resources including skills associated with the one or more users of the plurality of users, wherein the domain includes workload activities performed by the one or more users.

16. The computer system of claim 12, wherein the first model is trained using sets of the resource type and demonstrated resource capability information of current established resources, and corresponding sets of activities that are respectively performed using the sets of the resource type and demonstrated resource capability information.

* * * * *